United States Patent [19]
Wells

[11] Patent Number: 5,970,619
[45] Date of Patent: Oct. 26, 1999

[54] DEVICE FOR GUIDING ALIGNMENT IN TRAILER HITCHING

[76] Inventor: Robert L. Wells, P.O. Box 634, Murrells Inlet, S.C. 29576

[21] Appl. No.: 08/879,749

[22] Filed: Jun. 20, 1997

[51] Int. Cl.$^6$ ...................................................... B60D 1/40
[52] U.S. Cl. ............................................... 33/264; 33/268
[58] Field of Search ..................... 33/264, 268; 116/28 R

[56] References Cited

U.S. PATENT DOCUMENTS

| | | | |
|---|---|---|---|
| 2,797,406 | 6/1957 | Tanis et al. | 340/282 |
| 3,015,162 | 1/1962 | Bohnet | 33/286 |
| 3,363,318 | 1/1968 | Folkins et al. | 33/286 |
| 3,418,628 | 12/1968 | Fenner | 340/52 |
| 3,720,000 | 3/1973 | Schlegel | 33/364 |
| 3,774,149 | 11/1973 | Bennett | 340/52 R |
| 3,901,536 | 8/1975 | Black | 33/264 |
| 4,199,756 | 4/1980 | Dito | 340/686 |
| 4,583,481 | 4/1986 | Garrison | 33/264 |
| 4,856,200 | 8/1989 | Riggs | 33/264 |
| 5,290,056 | 3/1994 | Fath, IV | 280/477 |
| 5,669,621 | 9/1997 | Lockwood | 33/264 |

*Primary Examiner*—Bernard Roskoski
*Attorney, Agent, or Firm*—Michael E. Mauney

[57] ABSTRACT

A device for guiding alignment in trailer hitching with a trailer cup attachment and a towing vehicle attachment. The trailer cup attachment adjustably clips over the trailer cup on the drawbar of the trailer. The trailer cup attachment has at least one vertical rod and an alignment indicator equipped with guide lights and a sound generator to indicate when the ball on the towing vehicle is in hitching position relative to the trailer cup. The towing vehicle attachment has a mounting base for removable temporary mounting on the towing vehicle. Telescoping rods are rotatably mounted in the mounting base. At the end of the telescoping rods is a fluorescent colored activating ball which is positioned directly above the tow ball on the towing vehicle. The alignment guide and activating ball are positioned to be visible to the operator of the towing vehicle through a rear view mirror, rear window, or the like. As the towing vehicle backs toward the trailer, the activating ball and alignment guide provide immediate visual feedback to the operator of the towing vehicle, so that angle and speed of the backing vehicle may be accordingly adjusted. When the activating ball touches the alignment guide, a red light comes on and a sound is generated. This tells the operator of the towing vehicle that the tow ball is in hitching position relative to the trailer cup. The operator may then leave the vehicle and complete the hitching process.

8 Claims, 5 Drawing Sheets

DEVICE FOR GUIDING ALIGNMENT IN TRAILER HITCHING

BACKGROUND OF THE INVENTION

1. Field of Invention

This invention relates generally to a removable, adjustable, compact, light weight, durable attachment for trailer hitches. This attachment allows an operator of the towing vehicle to precisely back the towing vehicle into the proper aligned position so that coupling the towing vehicle to the trailer by the trailer hitch is simple and easily done by a single individual in any weather or lighting conditions.

2. Background Information

Trailers are towed on the highways by different types of vehicles. These trailers must necessarily be coupled or hitched to the towing vehicle which provides the motive power. Consequently a variety of ways of coupling a trailer to a towing vehicle have been devised. For large commercial trucks, there are hitches that are specially designed to be self-guiding, so that a single operator of the backing vehicle may easily complete the coupling process whereby the trailer is coupled to the towing vehicle. These types of self-guiding hitching systems are primarily found in commercial uses.

However, many individuals own a trailer. The trailer may be a camper home, boat trailer, or a utility trailer used to move furniture, garden supplies, and the like. Those who own these trailers rarely, if ever, have a specially dedicated vehicle that is used exclusively for towing these trailers. Rather, a car, pickup truck, sport utility vehicle, or station wagon, which is used for other purposes is adapted to be used to tow the trailer by means of an add-on trailer hitch. Ordinarily, on the towing vehicle the trailer hitch consists of a trailer ball mounted within a few inches of the rear bumper and at approximate bumper height. At the front end of the trailer terminating the draw bar is a cup or ring designed for receipt of the trailer ball. The ball of the trailer hitch on the back of the towing vehicle fits within the cup or ring on the draw bar of the trailer to be towed. Usually, there is some sort of locking device which helps secure the ball into the cup. The trailer is designed so that the wheels on the trailer are located between the center of gravity of the trailer and the rear end of the trailer. This means that the draw bar will be forced by the weight of the trailer toward the ground. It is ordinarily supported off the ground by a jack-like device that terminates at the ground end in a small wheel. The jack-like device is ordinarily operated by a crank which raises and lowers the draw bar of the trailer, so that the height of the cup or ring which receives the trailer hitch ball mounted on the towing vehicle may be varied by the operator by cranking the jack supporting the draw bar of the trailer either up or down, depending on the need of the operator. For safety reasons, the tongue weight of the draw bar of the trailer ordinarily must be, at least, fifty (50) pounds. For large trailers, it can be substantially more. Therefore, lifting the draw bar of the trailer without the use of the crank or moving the draw bar laterally requires considerable strength. Indeed, the strength required may be beyond that of most people for larger trailers or trailers that are heavily loaded. However, the tolerance of the receiving cup or ring on the draw bar and the ball on the towing vehicle trailer's hitch must be quite close in order that the attachment of the trailer to the towing vehicle be secure. Therefore, the ball of the trailer hitch of the towing vehicle must be positioned within a fraction of an inch immediately below the cup or ring on the draw bar of the trailer if the hitching process is to be successful.

Therefore, the process of hitching a towing vehicle to a trailer can sometimes be quite difficult and laborious. This is especially true if only one individual is involved in the hitching process. It can also be complicated by rainy weather, by attempting to hitch in an area with little maneuvering room, or attempting to hitch at night. Without some device to aid in alignment during the backing process, often the operator of the vehicle will have to make a number of attempts in which the vehicle is first backed, then moved forward and backed again, while the operator of the towing vehicle must get out of the vehicle and go to the rear of the vehicle to visually inspect the alignment of the hitching ball to the receptive cup on the draw bar of the trailer. Consequently, there is a need for a guide which can provide immediate feedback to the operator of the towing vehicle as he or she is attempting to back the vehicle into place beneath the draw bar of the trailer so that the coupling can be completed.

A variety of devices have been proposed to aid with alignment of a backing vehicle so that the coupling elements of the hitch are in appropriate position to complete the hitching process. For example, the Bennett patent, U.S. Pat. No. 3,774,149, involves a rod guide mounted to the trailer hitch connection on the towing vehicle, which includes an electric light. Likewise, mounted to the ball coupler on the draw bar of the trailer is a rod. Both rods extend upward. They are located so that as the backing vehicle approaches the appropriate position a spring-mounted electrical switch is activated causing the light visible to the operator of the backing vehicle to go on. The Fenner patent, U.S. Pat. No. 3,418,628, involves an electrical light and switch mounted on a rod. The light and switch are mounted by means of a ball that fits within the cup connection on the draw bar of the trailer. As the operator of the vehicle backs his vehicle into position, the hitch ball will activate a switch causing a light visible to the operator to go on once the operator of the vehicle has placed his ball hitch in hitching position below the trailer cup. The Riggs patent, U.S. Pat. No. 4,856,200, involves a pointer assembly for mounting on the rear portion of a vehicle. A target assembly is mounted on the tongue of the trailer. As the operator of the towing vehicle backs his vehicle, the pointer assembly attached to his vehicle will touch an arc shaped surface positioned on the target assembly, which activates a light or other means to indicate that appropriate alignment has been achieved. A somewhat different approach is seen in the Fath, IV, patent, U.S. Pat. No. 5,290,056. There, a surrogate ball and cup assembly are respectively mounted to the back of the towing vehicle and the tongue of the trailer. The surrogate ball and cup assembly are elevated so that they are visible to the operator of the backing vehicle. They are designed to replicate the positions of the ball on the towing vehicle and the cup on the trailer. Thus, when the surrogate ball and cup are aligned, the actual ball and cup are in the same alignment. Despite these earlier efforts, none of the above referenced patents have proven practical in operation and none have enjoyed substantial commercial success.

Therefore, it is an object of the present invention to remedy the perceived deficiencies in earlier devices. It is an object of the current invention to provide a trailer alignment guide which is simply and easily constructed of readily available materials. It is an object of the current invention to adjust so that it can be used on different styles of towing vehicles, including cars, truck, vans, sport utility vehicles, station wagons, or virtually any other vehicle that is commonly used by individuals to tow a trailer used for recreational or utility reasons. It is an object of the current invention to function even if the towing vehicle is backed at an oblique angle to the trailer if such is required by the operator. It is an object of the current invention to provide continuous visual feedback to the operator of the vehicle during the backing process, and to provide both a visual and sound feedback to the operator of the vehicle when the appropriate position is reached for coupling of the trailer cup to the towing vehicle ball. It is an object of the current invention to be easily attached and detached for use, to be light weight, durable, compact, to require no special technical expertise to use, and to be easy to use and foolproof in operation.

SUMMARY OF INVENTION

The trailer alignment guide of the current invention consists of two pieces. One is a trailer cup attachment which attaches to the trailer cup on the trailer to be towed. Ordinarily, there is a spring mounted clip which fits over the tailer cup and holds the trailer cup attachment in place. Extending vertically above the trailer cup attachment is a set of telescoping rods which may extend to increase the vertical height of the trailer cup attachment. An alignment indicator is attached to one of the telescoping rods. It will rotate around the rod and move along the vertical dimension of the rod. This allows the alignment indicator to be oriented so that the face of the alignment indicator is perpendicular to the line of approach of the towing vehicle. On the face of the alignment indicator is a spring activated switch. Above and spaced apart from the spring activated switch are two green lights which are shining to help the towing vehicle back correctly toward the trailer cup. The second piece is a towing vehicle attachment which is affixed to the towing vehicle. This has an activator ball attached to telescoping rods which are rotatably mounted in a mounting base that attaches to the towing vehicle. The towing vehicle attachment is oriented so that the activator ball is directly above the trailer ball on the towing vehicle. Therefore, when the activator ball touches the spring mounted switch on the alignment guide, the towing ball will be oriented so that as the jack support for the draw bar on the trailer is lowered, then the trailer cup will fit directly over the ball on the towing vehicle. When the activator ball presses the spring mounted switch on the alignment guide, two green lights stop shining and a red light comes on and a sound generator makes a noise. Both the trailer cup attachment and the towing vehicle attachment are easily adjusted to fit different trailer cups or towing vehicles respectively. The rotatable mounting of the alignment guide on the trailer cup attachment allows the operator of the towing vehicle to approach the trailer draw bar at different angles when using this device. The telescoping rods and the ways of mounting the towing vehicle attachment on the towing vehicle and the trailer cup attachment on the trailer cup respectively allow the alignment guide to be adopted to work on a wide variety of towing vehicles and trailers. The trailer alignment guide is compact, light weight, portable, and durable.

DETAILED DESCRIPTION OF THE DRAWINGS

Figure 1:
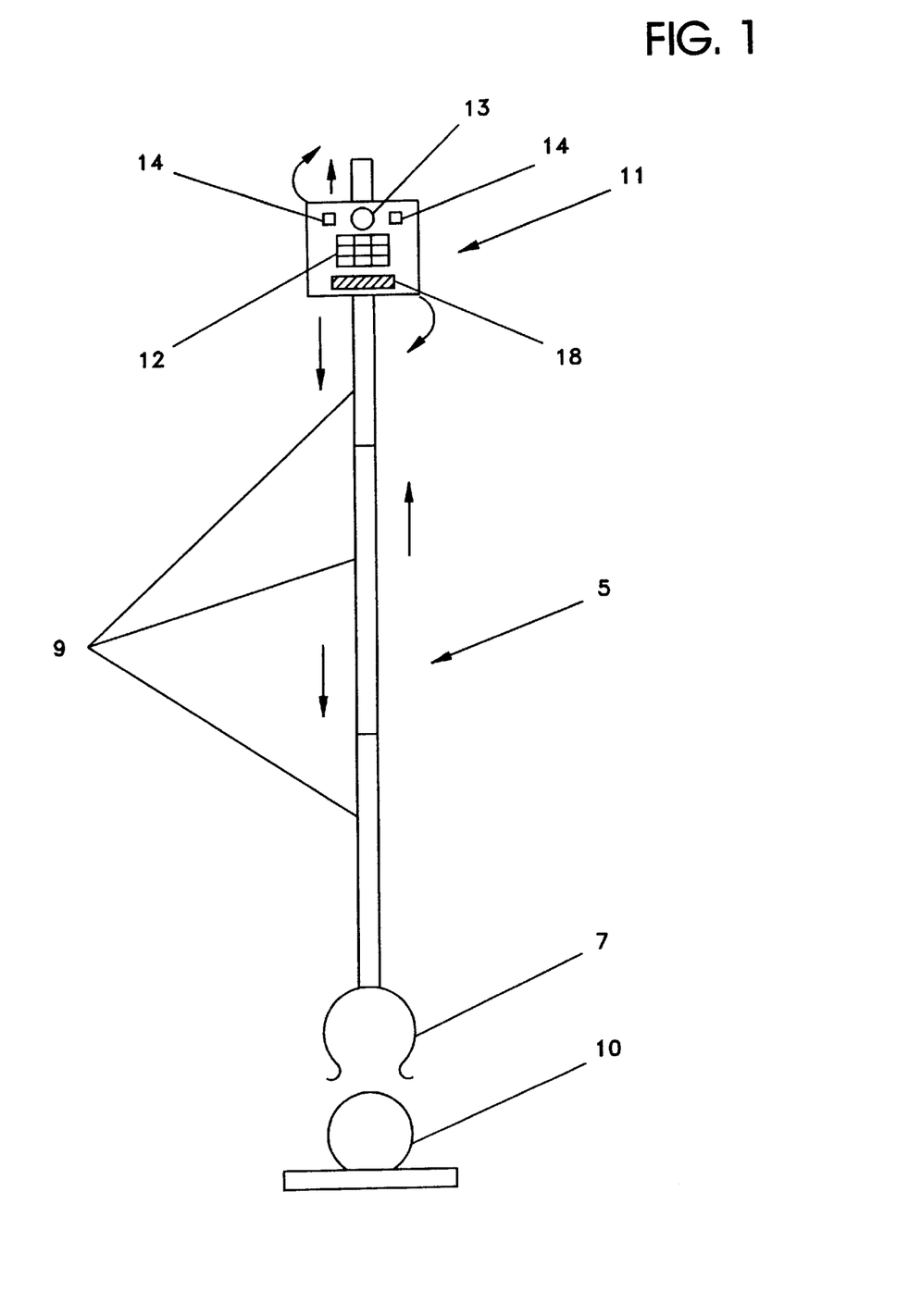
FIG. 1 shows a trailer cup attachment of the alignment guide invention.
Figure 2:
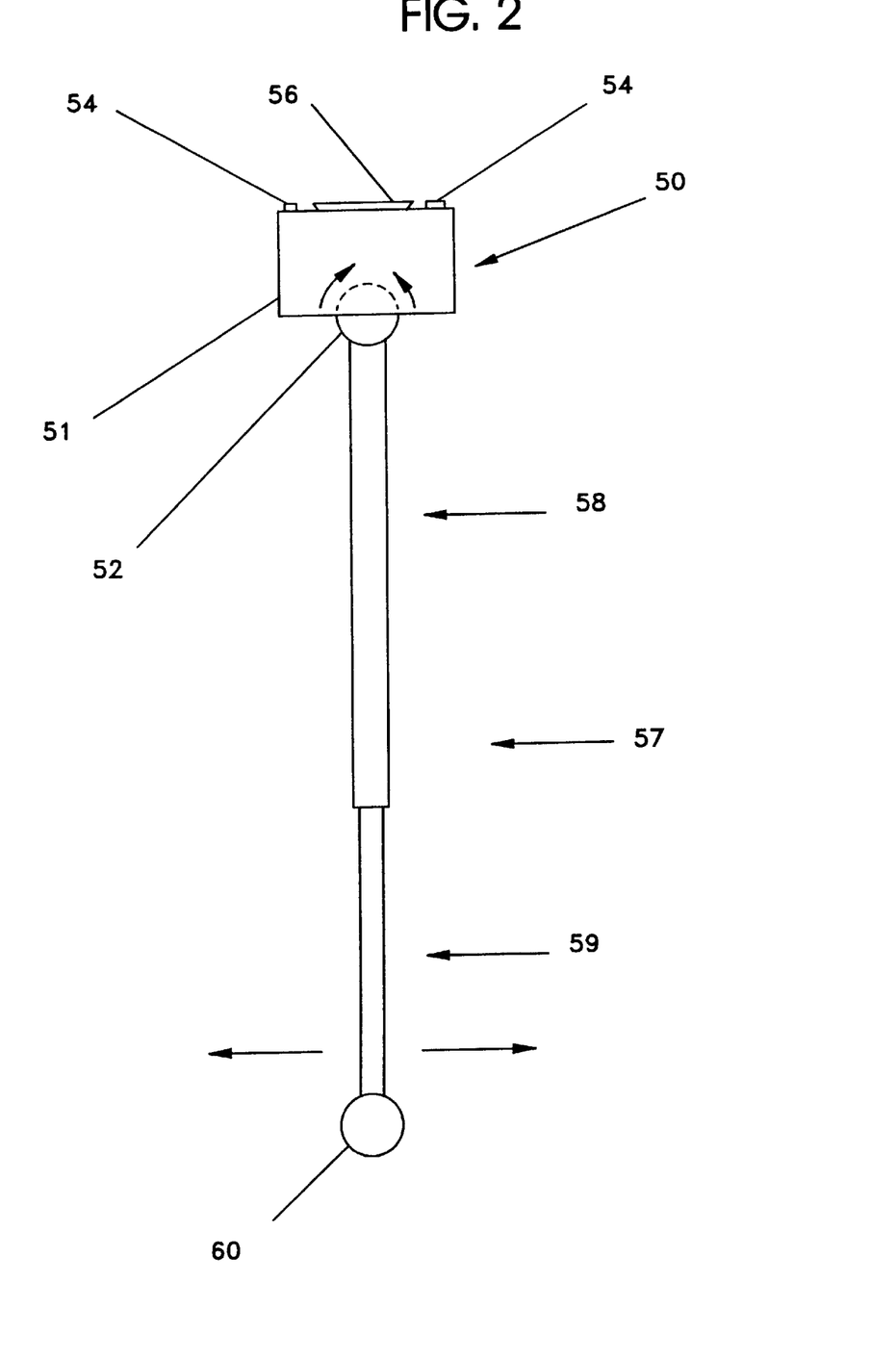
FIG. 2 shows the towing vehicle attachment of the current alignment guide invention.

FIG. 1 shows the trailer cup attachment (5) of the trailer alignment guide invention. The trailer alignment guide has a trailer cup attachment (5) and a towing vehicle attachment (50) (shown in FIG. 2). The trailer cup attachment (5) shown in FIG. 1, as its name implies, is attached to the trailer cup (10). The towing vehicle attachment (50), as its name implies and as is shown in FIG. 2, is attached to the towing vehicle. On the trailer cup attachment (5) a spring mounted clip (7) clips over a trailer cup (10) which is ordinarily at the end of the drawbar part of the trailer. It will be understood that other means of attaching the trailer cup attachment (5) to the trailer cup (10) could be used other than a spring mounted clip (7). These could include such items as clamps, vises, and the like. It is believed that a spring mounted clip (7) will adjust to fit most standard trailer cups (10) found on trailer draw bars and meets the requirements of this invention to be easily attached and removed while maintaining the trailer cup attachment in a stable position necessary for the operation of the invention. Extending vertically from the spring mounted clip (7) are vertical telescoping rods (9). These vertical telescoping rods (9) provide for a wide range of vertical height adjustment for the alignment indicator (11). A single rigid rod can also serve in many applications. However, it is believed telescoping rods can provide a wider range of adjustment with more compact storage, albeit at a greater cost. Some vehicles, especially vans and certain types of trucks, require that the alignment indicator (11) be elevated considerably above the point of attachment by the spring mounted clip (7) to the trailer cup (10) to be readily visible to the operator of the towing vehicle through rear or side view mirrors. Vertical telescoping rods (9) allow for this necessary vertical height adjustment. The alignment indicator (11) is also mounted for slidable, adjustable movement in the vertical direction, as is shown by the vertical arrows in FIG. 1. This allows for fine vertical adjustments on one of the telescoping rods or vertical adjustment along the length of a single rod. It is also mounted for rotatable adjustment as shown by the curved arrows in FIG. 1. The means of mounting the alignment indicator (11) on the vertical telescoping rods (9) are shown in more detail in FIG. 3B.

The alignment indicator (11) ordinarily consists of a small rectangular box. Approximately centered on the face of the alignment indicator (11) is a spring activated switch (12). When the spring activated switch (12) is pressed, it ordinarily activates a red light (13) and deactivates two green lights (14) or activates a sound generator (18) or both. As is seen in FIG. 3, a control switch (21) on the alignment indicator (11) allows the operator to deactivate the spring activated switch (12), to activate it so that it controls only lights (13) and (14), or only the sound generator (18), or both the lights (13) and (14) and the sound generator (18). When the red light (13) and green lights (14) are activated by the control switch (21), two green lights (14) will be lit until the spring activated switch (12) is pressed. When the spring activated switch (12) is pressed so as to activate it, then the red light (13) comes on and the green lights (14) go off. Ordinarily, the green lights (14) will be placed just outside of the widest dimensions of the spring activated switch (12). As will be seen in FIG. 4, this gives an aiming target for the operator of the vehicle that is being backed. Different arrangements of lights will work. Because the lights use battery power, the size and life of the battery will limit to some degree the light arrangement. Also, if it is desired to reduce the cost of the device, one or two lights could be used instead of the three light arrangement shown.

FIG. 2 shows the towing vehicle attachment (50). There is a mounting base (51). This will ordinarily be shaped as a parallelpiped box. The mounting base (51) will be equipped with magnets (54) and a suction cup (56). This enables the mounting base (51) to be removably attached to any convenient surface of almost any towing vehicle. Telescoping rods (57) are mounted within the mounting base (51) by means of a ball joint (52) which allows the telescoping rods to adjust within a hemisphere as shown by the arrows. Ordinarily, there will be a base telescoping rod (58) and at least one second telescoping rod (59). A single rigid rod could also be used. It would limit the adjustability of the towing vehicle attachment (50) but could be a manufacturing choice for economy models of this invention. At the terminal end of the second telescoping rod (59) is an activating ball (60). Ordinarily, this is constructed of a material that can be colored fluorescent orange, yellow, or some other readily visible color. In some applications it could have a light emitter contained therein. However, most towing vehicles are equipped with back up lights and it is believed making the activator ball (60) a bright color is sufficient to make it readily visible to the operator of the towing vehicle under almost all conditions that will be encountered in the trailer hitching process.

The mounting base (51) is placed on the towing vehicle by means of the magnets (54) or the suction cup (56) or both. The telescoping rods (57) will ordinarily be marked in a fashion that will enable the user of the device to know how far the activator ball (60) is from the base (51). This is necessary because the first time the device is used on a particular vehicle for towing a particular trailer, the telescoping rods (57) must be adjusted so that the activating ball (60) would be visible to the operator of the vehicle through a rear window, rear view mirror, or side view mirror. The rods are extended until the activator ball is positioned directly above the trailer hitch ball. The markings on the telescoping rods (57) will be noted. Because of the markings on the telescoping rod, the operator will know how far the device must be extended the next time it is used without again having to go through the trial-and-error process of adjusting it so that the activator ball is positioned correctly over the trailer hitch ball mounted on the back of the towing vehicle. The operator just extends the telescoping rods (57) to the same position as determined by the permanently noted markings on the telescoping rods (57).

Figure 3A:
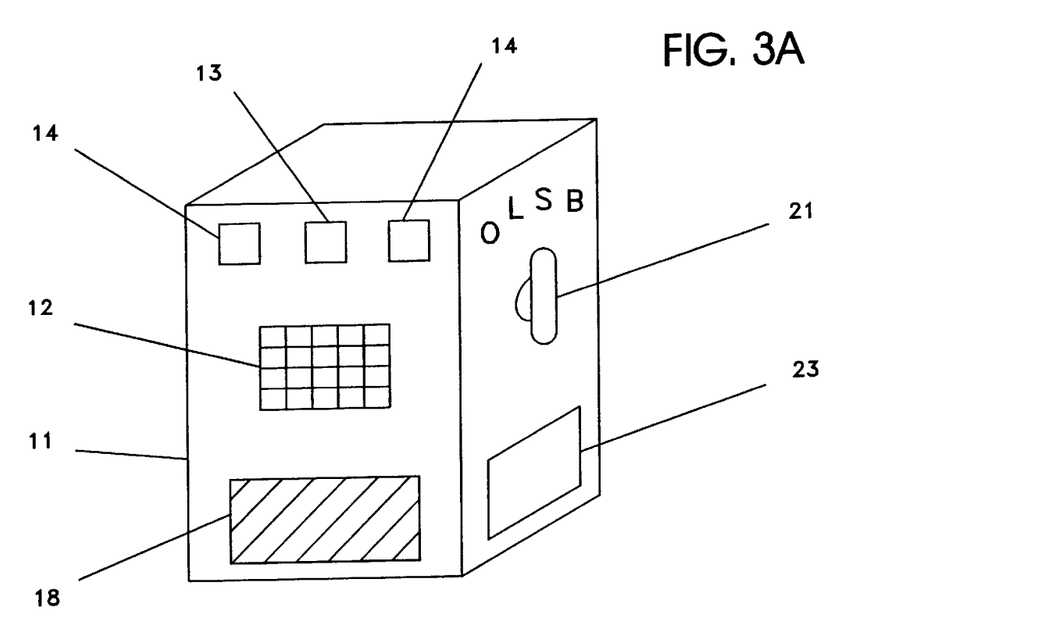
FIGS. 3A and 3B show the alignment indicator of the current alignment guide invention in more detail.
Figure 3B:
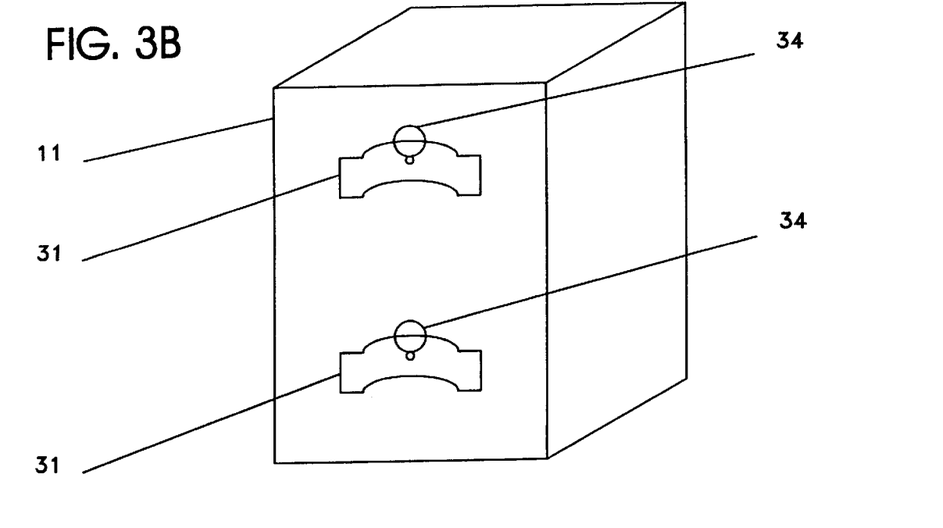

FIG. 3A and 3B shows the alignment indicator (11) in more detail. It is seen at an oblique angle from a front view in 3A and from a back view in 3B. The front view 3A shows in more detail the sound generator (18) and the spring activated switch (12). At the top of the alignment guide (11) are seen three light sources. Two green light sources marked (14) are positioned to be approximately aligned with the outside dimensions of the spring activated switch (12). Centered directly above the spring activated switch (12) is the red light source (13). Whenever the device is switched on and the lights activated by the control switch (21) which is mounted on the side of the box, the green lights (14) will come on. Also, the spring activated switch may be back lit when made of a semi-transparent material, so that it will also be visible to the operator of the towing vehicle during the backing and hitching process. The placement of the green lights (14) in alignment with the outside dimensions of the spring activated switch (12) will enable the operator of the towing vehicle to more easily align the indicator ball (60) on the towing vehicle attachment (50) with the needed position of contact with the spring activated switch (12). The control switch (21) is simply a rotatable switch. When the rotatable control switch (21) is pointed to the letter "O", then the device is deactivated. When the control switch (21) is pointed to the letter "L", then only the lights are activated. When it is pointed to the letter "S", then only the sound generator (18) is activated. When it is pointed to the letter "B", both lights and sound are activated. When the control switch (21) is pointed to the letter "L" or the letter "B", then the two outside green lights (14) are on. When the spring activated switch (12) is pressed and the control switch (21) is in either the "L" or "B" positions, then the green lights (14) go off and the red light (13) goes on. This tells the operator of the towing vehicle that the activator ball has activated the spring activated switch (12). The sound generator (18) will be activated when the spring activated switch (12) is pressed and the control switch (21) is either to the "S" or the "B" positions. The lights (13) and (14) and the sound generator (18) require electrical power to operate. Batteries are used to provide this power. The sound generator is piezo audio indicator using direct current. The batteries are inserted into the alignment guide (11) through the removable battery door (23). It is believed the above description will probably provide the greatest ease of use. However, it would place more demands on the battery power used to power the device than would a simpler light arrangement. Additionally, one or more toggle switches could also serve to activate the lights or sound or both. Choices of lights, sound generators, battery types, and switches are ones of manufacturing convenience and will be understood to be interchangeable to one of ordinary skill in the art. FIG. 3(b) shows the back of the alignment guide (11). Two U-shaped guides (31) are attached to the back of the alignment guide. The vertical telescoping rods (9) (not shown) will be slid upward between these two U-shaped guides (31) which are tightened into place by means of thumb screws (34). When the thumb screws (34) are loosened, then the alignment guide (11) may be slid up or down on the vertical telescoping rod (9) or may be rotated laterally. Once the desired position is achieved, the two thumb screws (34) are tightened to hold the alignment guide (11) in place on the vertical telescoping rod (9). Ordinarily, the major vertical adjustment for the alignment guide (11) will be accomplished by extending or retracting the telescoping rods (9). The U-shaped guides (31) will be used for fine vertical adjustment within the boundaries of one of the telescoping rods (9). However, if a single rigid rod was employed, then the U-shaped guides (31) could be used for vertical adjustment throughout the length of the single rigid rod. As mentioned in the description of FIG. 1, a single rigid rod may be preferable as a manufacturing choice to avoid the extra expense of telescoping rods.

Figure 4:
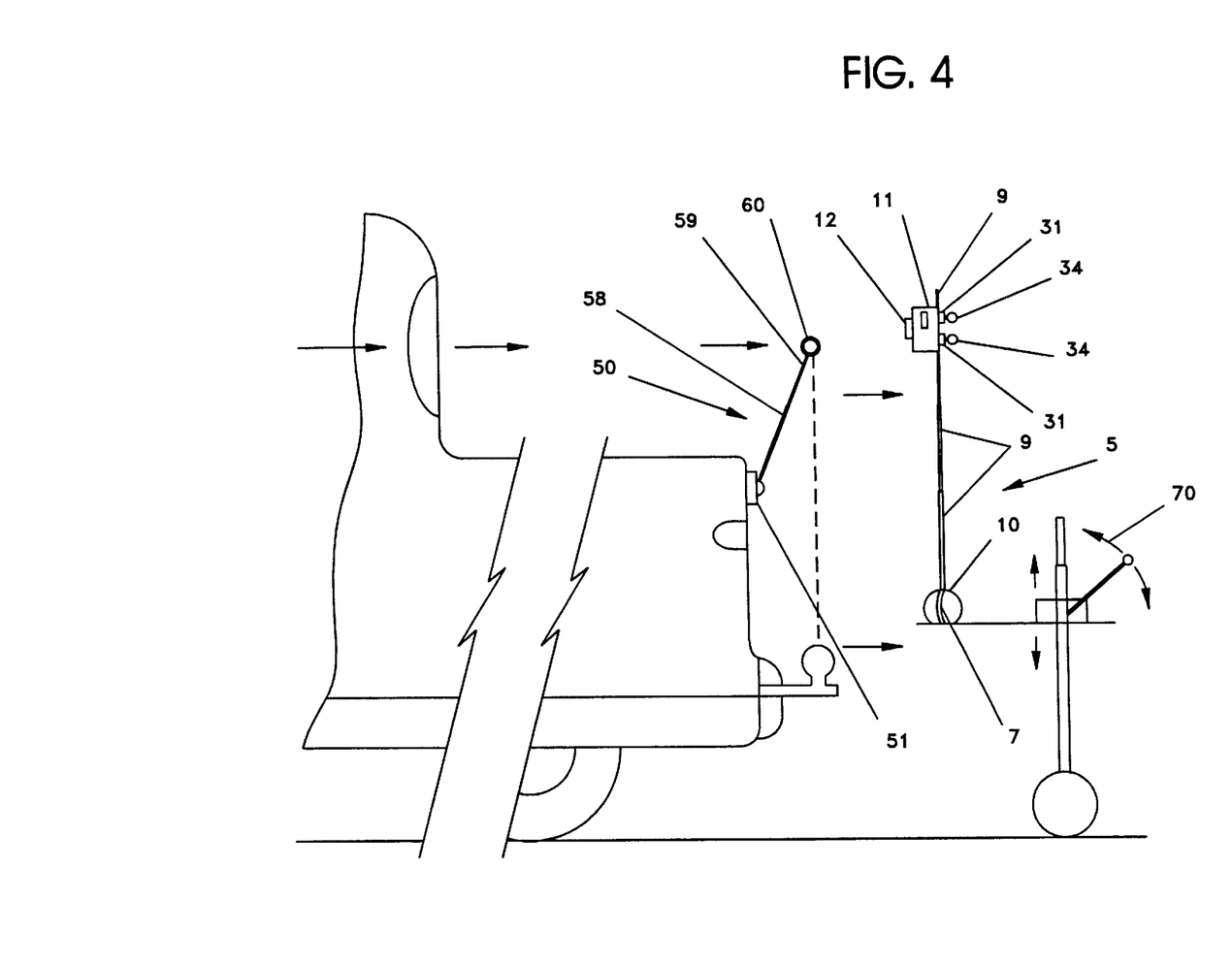
FIG. 4 shows the alignment guide invention in use on a vehicle resembling a car or a pick-up truck.

FIG. 4 shows the trailer alignment guide invention in use. The trailer cup attachment (5) is attached to the trailer cup (10) by the spring mounted clip (7). The vertical telescoping rods (9) are extended so that the alignment indicator (11) is visible to the operator of the towing vehicle through a rear view mirror on a direct line of sight, as indicated by the arrows. The spring activated switch (12) is aligned so that it is directly facing the line of sight of the operator of the towing vehicle. The towing vehicle attachment (50) is attached to the lid at the back of the towing vehicle by the mounting base (51). The base telescoping rods (58) and second telescoping rod (59) are extended with the activator ball (60) positioned directly over the trailer ball, as is shown by the vertical dotted line. The activator ball (60) is positioned precisely the same distance from the ground as is the spring activated switch (12). The operator of the towing vehicle will back his vehicle, observing the motion of the activator ball (60) as it approaches the spring activated switch (12). When the activator ball (60) touches the spring activated switch (12), it will activate the red light (13) (not shown) and the sound generator (18) (not shown) indicating that the towing ball is directly under the trailer cup. The trailer is then ready to be lowered onto the towing ball by means of the trailer crank jack (70) shown in the drawing. The versatility of the trailer alignment guide invention is illustrated in FIG. 4. It easily adopts to a pick-up truck-like vehicle as shown in FIG. 4 with a high line of sight and a low mounting point so that the activator ball (60) must be significantly elevated above the trailer cup to be seen. It is apparent it could be adopted to a passenger car. The towing vehicle attachment could go on the trunk deck or be attached close to the bumper. The telescoping rods (57) on the towing vehicle attachment allow extension of the activator ball to a position that is readily visible in the line of sight of the operator of the towing vehicle, regardless of whether the vehicle is a pick-up truck, a van, a sports utility vehicle, a car, or even a sports car. Moreover, the device can be readily moved from the family car to the family pick-up truck, which would require substantiality different adjustments for both the towing vehicle attachment and the trailer cup attachment. However, the markings on the telescoping rods (57) on both will allow quick and easy adjustment to the appropriate markings by the operator of the vehicle once the original positions are determined the first time the device is used on each vehicle.

Figure 4A:
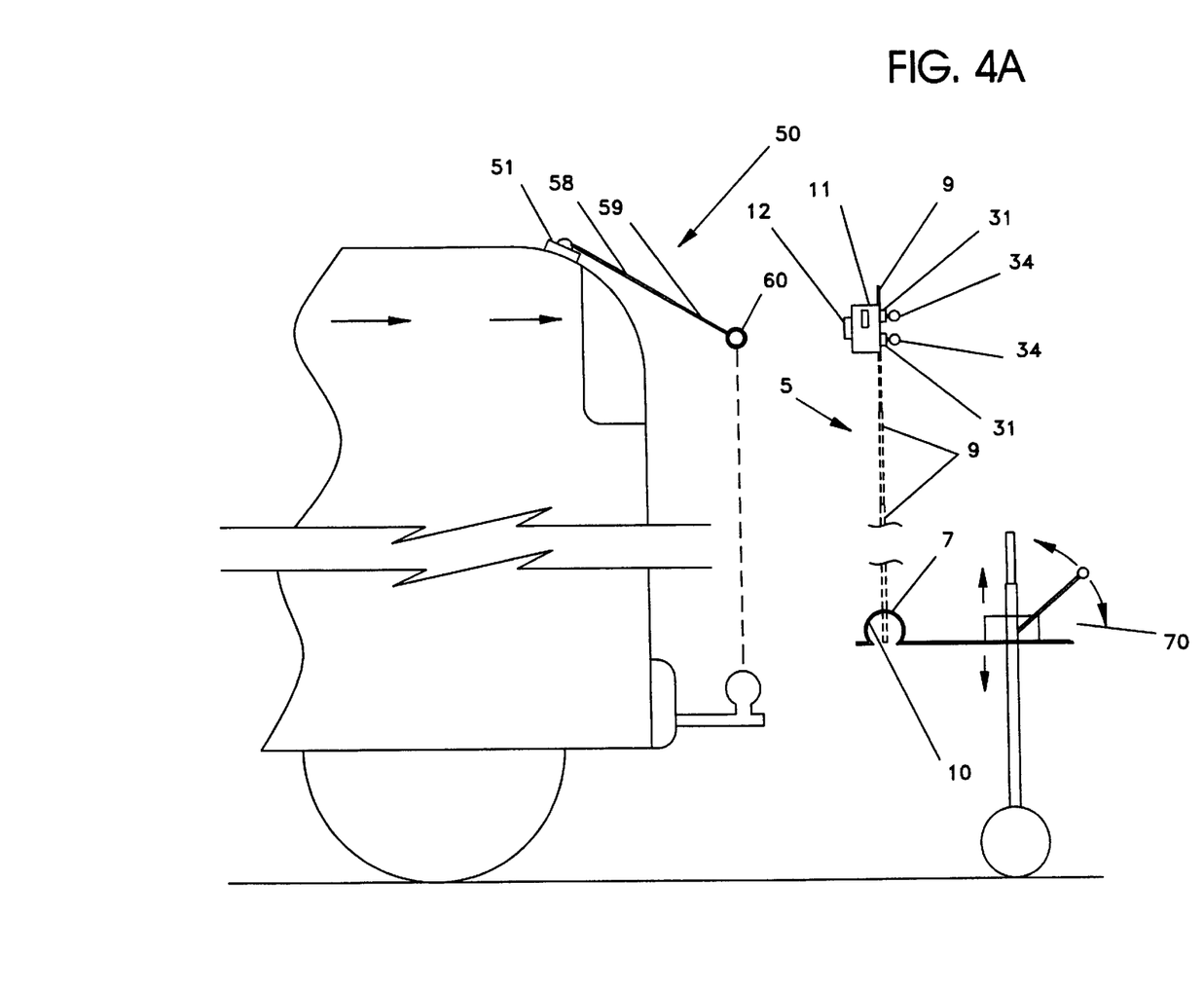
FIG. 4A shows the alignment guide invention in use on a vehicle resembling a van or sports utility vehicle.

FIG. 4A demonstrates how this invention can be easily adjusted to be used with a completely different type towing vehicle like a van. As it will be understood, a van or the like usually sits substantially higher than either a car or even a pick-up truck, and the rear window through which the operator controls the backing is substantially higher than is the case for a car. As seen in FIG. 4A, the vertical telescoping rods (9) are fully extended. The trailer cup attachment (5) is attached to the trailer cup (10) by the spring mounted clip (7). The vertical telescoping rods (9) are fully extended to raise the alignment indicator (11) to be visible to the operator of the van through a rear view mirror in a direct line of sight indicated by the arrows. The spring activated switch (12) is aligned so that it is directly facing the line of sight of the operator of the towing van. As before, the towing vehicle attachment (50) is attached to the towing vehicle, in this case, to the roof of the towing vehicle above the rear window by the mounting base (51). The activator ball (60) is positioned the same distance from the ground as the spring activated switch (12) so that as the operator of the towing vehicle backs the vehicle, the activator ball (60) will push the spring activated switch (12) when the towing ball is directly under the trailer cup. As FIG. 4 and FIG. 4A demonstrate, the current invention easily adapts to different towing vehicles and trailers.

The foregoing description is on the preferred embodiment only. It will be apparent to one of ordinary skill in the art, that modifications and adaptations may be made without departing from the spirit and scope of the present invention. However, it is expressly understood that the foregoing preferred embodiment description was not restrictive and that such modifications and adaptations fall within the following claims.

What is claimed is:

1. A trailer alignment guide providing visual and sound feedback to allow precise backing of a towing vehicle at different angles of approach to inform the operator of the towing vehicle when the towing ball is in hitching position relative to the trailer cup comprising:

(a) a trailer cup attachment including a means for attaching said trailer cup attachment to different sizes and shapes of trailer cups, and at least one vertical support rod extending directly above and connecting to said means for attaching said trailer cup attachment;

(b) an alignment indicator including a spring-activated switch, means for visually indicating when said spring-actuated switch is depressed, means for aurally indicating when said spring-activated switch is depressed, means for providing electrical power to said means for visual indication and said means for aural indication, a control switch for controlling means for providing electrical power to said means for visual indication and to said means for aural indication;

(c) means for mounting said alignment indicator to said vertical rod part of said trailer cup attachment, whereby said alignment indication may be rotated around said vertical rod and moved vertically on said vertical rod;

(d) a towing vehicle attachment including a mounting base, means for attaching said mounting base to a towing vehicle, at least one rod terminating at a first end in a brightly colored activating ball, means for rotatably mounting said rod to said mounting base at a second end of said rod;

whereby an operator of a towing vehicle in all weather conditions and in all lighting conditions can back a towing vehicle, being visually guided by said brightly colored activating ball and said alignment indicator, including said visual means, until said brightly colored ball depresses said spring-activated switch on said alignment indicator, thereby further activating said visual means and said sound means thereby notifying a driver of a towing vehicle that a towing ball is in hitching position relative to a trailer cup so that hitching may be completed.

2. A trailer alignment guide providing visual and sound feedback to allow precise backing of a towing vehicle at different angles of approach to inform the operator of the towing vehicle when the towing ball is in hitching position relative to the trailer cup as recited in claim 1, wherein said means for visually indicating when said spring-activated switch is depressed in said alignment indicator includes green lights spaced apart at opposite sides of said spring-activated switch and spaced above said spring-activated switch and one red light equidistant between said green lights and along a line connecting said green lights, whereby when said control switch is activated, said green lights shine continuously until said spring-activated switch is depressed which extinguish said green lights and activate said red light.

3. A trailer alignment guide providing visual and sound feedback to allow precise backing of a towing vehicle at different angles of approach to inform the operator of the towing vehicle when the towing ball is in hitching position relative to the trailer cup as recited in claim 2, wherein said means for aurally indicating when said spring-activated switch is depressed is an electrical sound generator placed in said alignment indicator below said spring-activated switch in said alignment indicator, whereby when said control switch is activated and said spring-activated switch is depressed, said sound generator generates a noise readily apparent to an operator of a towing vehicle.

4. A trailer alignment guide providing visual and sound feedback to allow precise backing of a towing vehicle at different angles of approach to inform the operator of the towing vehicle when the towing ball is in hitching position relative to the trailer cup as recited in claim 3, wherein said means for providing electrical power to said means for visual indication and said means for aural indication is a battery placed within said alignment indicator.

5. A trailer alignment guide providing visual and sound feedback to allow precise backing of a towing vehicle at different angles of approach to inform the operator of the towing vehicle when the towing ball is in hitching position relative to the trailer cup comprising:

(a) a trailer cup attachment including a means for attaching said trailer cup attachment to different sizes and shapes of trailer cups, and a first set of telescoping rods extending directly above and connecting to said means for attaching said trailer cup attachment;

(b) an alignment indicator including a spring-activated switch, means for visually indicating when said spring-actuated switch is depressed, means for aurally indicating when said spring-activated switch is depressed, means for providing electrical power to said means for visual indication and said means for aural indication, and a control switch for controlling means for providing electrical power to said means for visual indication and to said means for aural indication;

(c) means for mounting said alignment indicator to said first set of telescoping rods part of said trailer cup attachment, whereby said alignment indication may be rotated around said vertical rod and moved vertically on said vertical rod;

(d) a towing vehicle attachment including a mounting base, means for attaching said mounting base to a towing vehicle, a second set of telescoping rods terminating at a first end in a brightly colored activating ball, means for rotatably mounting said second set of telescoping rods to said mounting base;

whereby an operator of a towing vehicle in all weather conditions and in all lighting conditions can back a towing vehicle, being visually guided by said brightly colored activating ball and said alignment indicator, including said visual means, until said brightly colored ball depresses said spring-activated switch on said alignment indicator activating said visual means and said sound means thereby notifying a driver of a towing vehicle that a towing ball is in hitching position relative to a trailer cup and that hitching may be completed.

6. A trailer alignment guide providing visual and sound feedback to allow precise backing of a towing vehicle at different angles of approach to inform the operator of the towing vehicle when the towing ball is in hitching position relative to the trailer cup as recited in claim 5, wherein said means for visually indicating when said spring-activated switch is depressed in said alignment indicator includes a first and a second green light, said first and second green light spaced apart at opposite ends of said spring-activated switch and spaced above said spring-activated switch and one red light equidistant between said first and second green light and along a line connecting said first and second green light, whereby when said control switch is activated said green lights shine continuously until said spring-activated switch is depressed which extinguishes said green lights and activates said red light.

7. A trailer alignment guide providing visual and sound feedback to allow precise backing of a towing vehicle at different angles of approach to inform the operator of the towing vehicle when the towing ball is in hitching position relative to the trailer cup as recited in claim 6, wherein said means for aurally indicating when said spring-activated switch is depressed is an electrical sound generator placed in said alignment indicator below said spring-activated switch in said alignment indicator, whereby when the control switch is activated and said spring-activated switch is depressed said sound generator generates a noise readily apparent to an operator of a towing vehicle.

8. A trailer alignment guide providing visual and sound feedback to allow precise backing of a towing vehicle at different angles of approach to inform the operator of the towing vehicle when the towing ball is in hitching position relative to the trailer cup as recited in claim 7, wherein said means for providing electrical power to said means for visual indication and said means for aural indication is a battery placed within said alignment indicator.

* * * * *